Oct. 20, 1970  J. JAFFE  3,535,233
CATALYST COMPRISING RHENIUM AND LAYERED SYNTHETIC
CRYSTALLINE ALUMINOSILICATE AND
PROCESS USING SAID CATALYST
Filed Aug. 5, 1968

INVENTOR
JOSEPH JAFFE
BY R. H. Davies
ATTORNEY

United States Patent Office 3,535,233
Patented Oct. 20, 1970

3,535,233
CATALYST COMPRISING RHENIUM AND LAYERED SYNTHETIC CRYSTALLINE ALUMINOSILICATE AND PROCESS USING SAID CATALYST
Joseph Jaffe, Berkeley, Calif., assignor to Chevron Research Company, San Francisco, Calif., a corporation of Delaware
Filed Aug. 5, 1968, Ser. No. 750,038
Int. Cl. C10g 35/08
U.S. Cl. 208—111                  15 Claims

ABSTRACT OF THE DISCLOSURE

A catalyst comprising a layered synthetic crystalline aluminosilicate cracking component and 0.01 to 3.0 weight percent, based on said cracking component and calculated as the metal, of a hydrogenating component selected from the group consisting of rhenium and compounds of rhenium, and process using said catalyst.

INTRODUCTION

This invention relates to catalytic hydrocracking of petroleum distillates and solvent-deasphalted residua to produce high-value fuel products, including gasoline.

PRIOR ART

It is well known that a wide variety of crystalline zeolitic molecular sieves may be used as the cracking component of hydrocracking catalysts. It is also well known that the preferred, and most commonly used, hydrogenating components associated with these zeolitic cracking supports are platinum and palladium. Rabo et al. U.S. Pat. 3,236,761, for example, provides a particular type of decationized zeolitic molecular sieve catalyst, which may be used in some reactions without added metals, and in some reactions with added metals. The various applicable reactions are isomerization, reforming, cracking, polymerization, alkylation, dealkylation, hydrogenation, dehydrogenation and hydrocracking. Rhenium is named as a metal with which the molecular sieve may be loaded, but it is not clear from the patent which reactions such a catalyst would be used to catalyze. No example of a rhenium-molecular sieve catalyst is given, and the hydrocracking portion of the disclosure indicates that the molecular sieve catalyst of the patent may be used for hydrocracking without added metals, but preferably with added platinum or palladium if a metal-loaded molecular sieve is to be used. Further, because of the great stress placed by the Rabo et al. patent on Group VIII metals in association with a molecular sieve cracking component, and particularly the noble metals, and the absence of any interest in rhenium except a passing mention, there is no guide in the patent either as to the applicability of a rhenium-molecular sieve catalyst for the hydrocracking reaction in particular, or to the amount of rhenium such a catalyst should contain, or to the hydrocracking results that might be expected.

It is also known in the art to use 2 weight percent rhenium in association with a gel-type silica-alumina cracking component for the hydrocracking of hydrocarbon fractions. For example, Wilson U.S. Pat. 3,-278,418 makes such a disclosure. However, it is also known that such a catalyst has low hydrocracking activity, and that a promoter must be used with the rhenium to provide a catalyst having acceptable activity. Accordingly, the Wilson patent indicates that the rhenium-silica-alumina catalyst of his Examples 1 and 2 had activity indices of 42 and 47, respectively, whereas with the addition of a silver promoter for the rhenium, activity indices as high as 95 could be achieved. The data in the Wilson patent indicate that with rhenium levels as high as 2 weight percent, the rhenium-silica-alumina hydrocracking catalyst had only moderate activity. A higher hydrocracking activity would have been obtained with a higher rhenium level, but the cost of rhenium makes higher levels undesirable. Wilson was able partially to solve the problem of maintaining low levels of rhenium and adequate hydrocracking activity by adding a second hydrogenation component—silver—to the catalyst. However, this was accomplished only at a sacrifice in catalyst stability. As correctly indicated by Wilson, a hydrocracking catalyst having a silica-alumina cracking component is extremely nitrogen-sensitive, and the hydrocarbon feed hydrocracked in the presence of such a catalyst must be pretreated to reduce the nitrogen content to a low level; more than minor amounts of nitrogen in the hydrocarbon feed have an intolerable poisoning effect on the acid sites of the cracking component of the catalyst, seriously diminishing cracking activity.

It is also known that a crystalline zeolitic molecular sieve cracking component, while relatively insensitive to organic nitrogen compounds and ammonia, has a well-ordered and uniform pore structure as a result of the crystal structure having bonds that are substantially equally strong in three dimensions. This provides definite limitations on the access of reactant molecules to the interiors of the pores.

It is also known that conventional catalysts having a crystalline zeolitic molecular sieve cracking component and a platinum hydrogenating component are sulfur-sensitive, and that while they are more sensitive to organic sulfur compounds they also are sensitive to $H_2S$. In each case the sulfur acts as a poison, particularly for the hydrogenation component, and reduces the hydrogenation activity of the catalyst, which in turn increases the fouling susceptibility of the catalyst.

It is also known, particularly from Granquist U.S. Pat. 3,252,757, that a relatively new crystalline aluminosilicate that has been synthesized has the empirical formula $$n\text{SiO}_2:\text{Al}_2\text{O}_3:m\text{AB}:x\text{H}_2\text{O}$$ 

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the latice,
B is chosen from the group of negative ions which consists of $F^-$, $OH^-$, $\frac{1}{2}O^{--}$ and mixtures thereof, and is internal in the latice, and
$x$ is from 2.0 to 3.5 at 50% relative humidity, said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations.

Said aluminosilicate mineral, in the dehydrated form, is known from U.S. Pat. 3,252,889 to have application as a component of a catalytic cracking catalyst; however, applications of said mineral in either hydrated or dehydrated form, as a component of a hydrocracking catalyst have not been disclosed heretofore.

OBJECTS

In view of the foregoing, objects of the present invention include providing a novel catalyst useful for hydrocracking, and a novel hydrocracking process using said catalyst, said catalyst:

(1) Having a cracking component less sensitive to nitrogen poisoning than silica-alumina gel;

(2) Having a cracking component that is crystalline in structure, having pores elongated in two directions, contrary to the pores of crystalline zeolitic molecular sieves, and therefore having less reactant access limitations than the pores of such molecular sieves;

(3) Having a hydrogenating component at least as insensitive to sulfur poisoning as platinum;

(4) Having a high hydrocracking activity with economically low levels of the hydrogenating component;

(5) Having a hydrogenating component that can be used at the same low levels as can the prior art noble metals, but that is generally less costly than those noble metals;

(6) Having a high stability with said low levels of hydrogenating component, even in the presence of an additional hydrogenating component.

It is a further object of the present invention to provide various embodiments of a hydrocracking process using a catalyst having the aforesaid characteristics, including methods of further improving catalyst stability, and methods of operating the hydrocracking process in an integrated manner with other process units to achieve various advantageous results.

The present invention will best be understood, and further objects and advantages thereof will be apparent, from the following description when read in connection with the accompanying drawing.

DRAWING

STATEMENT OF INVENTION

Figure 1:
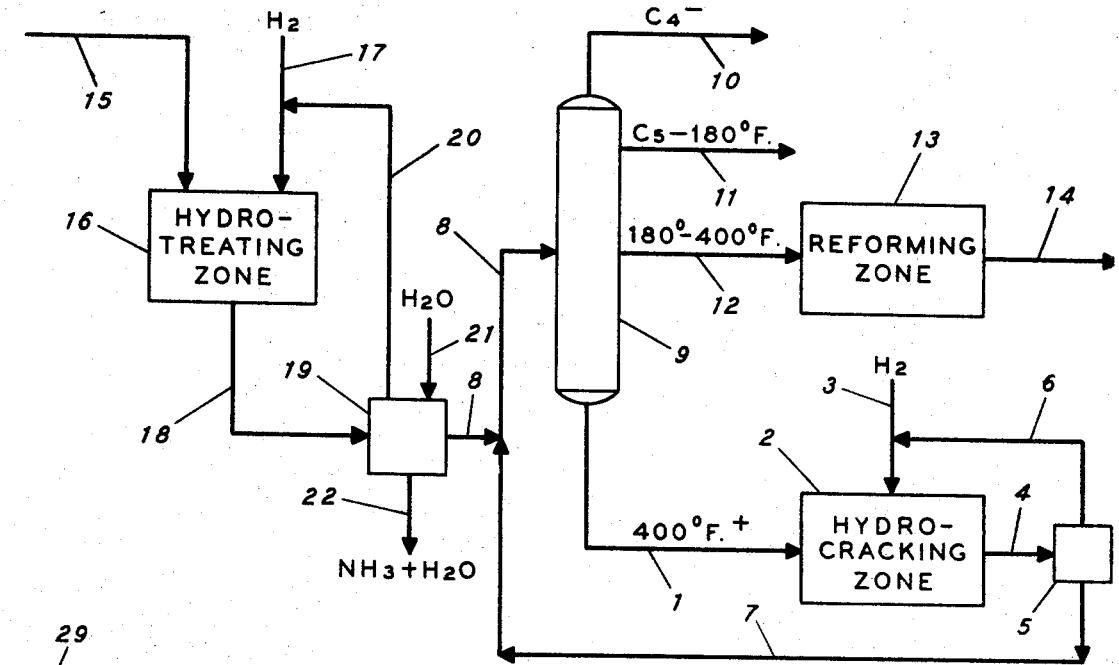
FIG. 1 is a diagrammatic illustration of apparatus and flow paths suitable for carrying out the process of several of the embodiments of the present invention, including embodiments wherein a hydrofining zone precedes the hydrocracking zone, and embodiments wherein a selected fraction from the hydrocracking zone is catalytically reformed.

It has been found that a catalyst comprising the layered synthetic crystalline aluminosilicate mineral of Granquist U.S. Pat. 3,252,757, in dried and calcined form, and a rhenium or rhenium-compound hydrogenating component in an amount of 0.01 to 3.0 weight percent, calculated as metal and based on said cracking component, has all of the desirable catalyst attributes listed under "Objects" above and, therefore, in accordance with the present invention there is provided such a catalyst and a hydrocracking process using such a catalyst. It is not obvious from Rabo et al. U.S. Pat. 3,236,761 that a rhenium-crystalline zeolitic molecular sieve catalyst has application as a hydrocracking catalyst, or what rhenium levels such a catalyst should contain. It is even less obvious from Rabo et al. that not only should rhenium be used instead of a noble metal, but that the layered synthetic crystalline aluminosilicate mineral of Granquist U.S. Pat. 3,252,757 could be used instead of a crystalline zeolitic molecular sieve. Even if such matters were clear from Rabo et al., Wilson U.S. Pat. 3,278,418 would lead a man skilled in the art to conclude that such a catalyst would either need to contain *considerably* more than 2 weight percent rhenium or that it must contain an additional hydrogenating component to obtain adequate hydrocracking activity. It has been found that neither of these conclusions is correct. Wilson also would lead a man skilled in the art to conclude, even if he considered use for hydrocracking of the catalyst used in the process of the present invention: (a) that it would need to contain an additional hydrogenating component in order to be able to maintain adequate hydrocracking activity at acceptably low rhenium levels; and (b) that such additional component would cause the catalyst stability to suffer markedly. These conclusions also are not correct. Accordingly, it has been found that the catalyst of the present invention surprisingly provides advantages over the Rabo et al. platinum or palladium on molecular sieve hydrocracking catalyst and the Wilson rhenium-silica-alumina hydrocracking catalyst, while unexpectedly being free from disadvantages that the art would lead one to expect.

In accordance with the present invention, therefore, there is provided a catalyst effective for various hydrocarbon conversion reactions, including hydrocracking, hydrodesulfurization, hydrodenitrification, hydrogenation and hydroisomerization, comprising:

(A) A dried and calcined layer-type, clay-like mineral which prior to drying and calcining has the empirical formula

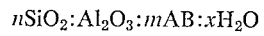

$$n SiO_2 : Al_2O_3 : m AB : x H_2O$$

where the layer lattices comprise said silica, said alumina, and said B, and where $n$ is from 2.4 to 3.0

$m$ is from 0.2 to 0.6

A is one equivalent of an exchangeable cation having a valence not greater than 2, and is external to the lattice, B is chosen from the group of negative ions which consists of $F^-$, $OH^-$, $\frac{1}{2}O^{--}$ and mixtures thereof, and is internal in the lattice, and $x$ is from 2.0 to 3.5 at 50% relative humidity, said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations, and (B) A hydrogenating component selected from the group consisting of rhenium and compounds of rhenium.

Said mineral may be present in said catalyst in an amount of 10 to 99.9 weight percent, based on the total catalyst. If desired, said catalyst may further comprise a crystalline zeolitic molecular sieve component in the amount of 1 to 40 weight percent based on the total catalyst. Said hydrogenating component is present in said catalyst in an amount of 0.01 to 3.0 weight percent, based on said mineral. The equivalent of an exchangeable cation, A, in said catalyst may be chosen from the group consisting of $H^+$, $NH_4^+$, $Na^+$, $Li^+$, $K^+$, $\frac{1}{2}Ca^{++}$, $\frac{1}{2}Mg^{++}$, $\frac{1}{2}Sr^{++}$, and $\frac{1}{2}Ba^{++}$ and mixtures thereof. In a particularly desirable modification, said catalyst further comprises a hydrogenating component selected from the group consisting of Group VI metals and compounds thereof and Group VIII metals and compounds thereof, and a component selected from the group consisting of alumina and silica-alumina.

Further in accordance with the present invention, there is provided a hydrocracking process which comprises contacting a hydrocarbon feedstock containing substantial amounts of materials boiling above 200° F. and selected from the group consisting of petroleum distillates, solvent-deasphalted petroleum residua, shale oils and coal tar distillates, in a reaction zone with hydrogen and the aforesaid catalyst comprising a layered synthetic crystalline alumino-silicate mineral at hydrocracking conditions including a temperature in the range 400° to 950° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of said feedstock, and recovering from said reaction zone valuable products, including gasoline. The hydrocarbon feedstock preferably contains less than 1000 p.p.m. organic nitrogen. A prior hydrofining step may be used, if desired, to reduce the feed nitrogen content to the preferred level; however, because of the superior nitrogen tolerance of the layered synthetic crystalline aluminosilicate mineral component, compared with silica-alumina, the hydrofining step need not accomplish complete nitrogen content reduction, as further discussed hereinafter.

Further in accordance with the present invention, advantageous results are obtained by providing in the reaction zone, in addition to said catalyst comprising a layered synthetic crystalline aluminosilicate mineral, a separate second catalyst comprising a hydrogenating component selected from Group VI metals and compounds thereof, a hydrogenating component selected from Group VIII metals and compounds thereof, and a component selected from the group consisting of alumina and silica-alumina. Further in accordance with the present invention, said separate second catalyst may be located in said reaction zone in a bed disposed above said catalyst comprising a layered crystalline synthetic aluminosilicate mineral cracking component. In the embodiments of the present invention discussed in this paragraph, no other prior hydrofining step generally will be necessary, because hydrofining is accomplished in one reaction zone concurrently with hydrocracking, together with some hydrogenation of aromatics.

Still further in accordance with the present invention there is provided a hydrocracking process which comprises sequentially contacting a hydrocarbon feedstock and hydrogen with a first bed of catalyst and then with a second bed of catalyst, said catalyst beds both being located within a single elongated reactor pressure shell, said first bed of catalyst being located in an upper portion of said shell, the catalyst of said first bed comprising a hydrogenating component selected from the group consisting of Group VI metals and compounds thereof and Group VIII metals and compounds thereof, and a component selected from the group consisting of alumina and silica-alumina, the catalyst of said second bed being said catalyst comprising a layered synthetic crystalline aluminosilicate mineral, maintaining said first bed of catalyst and said second bed of catalyst at a temperature in the range 400° to 950° F. and a pressure in the range 800 to 3500 p.s.i.g. during said contacting, maintaining the total supply rate of said hydrogen into said reactor shell from 200 to 20,000 s.c.f. of hydrogen per barrel of said feedstock, and recovering a gasoline product from the effluent of said second bed of catalyst.

The hydrocracking zone of the process of the present invention may be operated once through, or advantageously may be operated by recycling thereto materials from the effluent thereof that boil above 200° F., preferably above 400° F. All or a portion of these heavier materials advantageously may be catalytically cracked. The heavy gasoline fraction from the hydrocracking zone advantageously may be catalytically reformed.

HYDROCARBON FEEDSTOCKS

The feedstocks supplied to the hydrocracking zone containing said catalyst comprising a layered synthetic crystalline aluminosilicate mineral in the process of the present invention are selected from the group consisting of petroleum distillates, solvent-deasphalted petroleum residua, shale oils and coal tar distillates. The feedstocks contain substantial amounts of materials boiling above 200° F., preferably substantial amounts of materials boiling in the range 350° to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. As discussed hereinafter, the feedstocks may have been subjected to a hydrofining and/or hydrogenation treatment, which may have been accompanied by some hydrocracking, before being supplied to the hydrocracking zone containing said catalyst comprising a layered synthetic crystalline aluminosilicate mineral.

NITROGEN CONTENT OF FEEDSTOCKS

While the process of the present invention can be practiced with utility when supplying to the hydrocracking zone containing a catalyst comprising a layered synthetic crystalline aluminosilicate mineral, hydrocarbon feeds containing relatively large quantities of organic nitrogen, for example several thousand parts per million organic nitrogen, it is preferred that the organic nitrogen content be less than 1000 parts per million organic nitrogen. A preferred range is 0.5 to 1000 parts per million; more preferably, 0.5 to 100 parts per million. As previously discussed, a prior hydrofining step may be used, if desired, to reduce the feed nitrogen content to the preferred level. The prior hydrofining step advantageously may also accomplish hydrogenation and a reasonable amount of hydrocracking. Because of the superior tolerance of the layered synthetic crystalline aluminosilicate mineral component for organic nitrogen compounds, compared with silica-alumina, the hydrofining step need not accomplish complete organic nitrogen content reduction. Further, because of the superior tolerance of said component for ammonia, compared with silica-alumina, and because said component is more tolerant of ammonia than of organic nitrogen compounds, ammonia produced in the hydrofining zone either may be removed from the system between the hydrofining zone and the hydrocracking zone containing the hydrocracking catalyst comprising said component, or may be permitted to pass into the hydrocracking zone along with the feed thereto.

SULFUR CONTENT OF FEEDSTOCKS

While the process of the present invention can be practiced with utility when supplying to the hydrocracking zone, containing a catalyst comprising a layered synthetic crystalline aluminosilicate mineral, hydrocarbon feeds containing relatively large quantities of organic sulfur, it is preferable to maintain the organic sulfur content of the feed to that zone in a range of 0 to 3 weight percent, preferably 0 to 1 weight percent.

CATALYST COMPRISING A LAYERED SYNTHETIC CRYSTALLINE ALUMINOSILICATE MINERAL COMPONENT AND A RHENIUM OR RHENIUM-COMPOUND HYDROGENATING COMPONENT

(A) General

The layered synthetic crystalline aluminosilicate mineral cracking component of the catalyst is adequately described above and prior to drying and calcining, also in Granquist U.S. Pat. 3,252,757. This component will be present in the catalyst in an amount of 10 to 99.9 weight percent, based on the total catalyst.

The rhenium hydrogenating component of the catalyst may be present in the final catalyst in the form of the metal, metal oxide, metal sulfide, or a combination thereof. The rhenium or compound thereof may be combined with the layered synthetic crystalline aluminosilicate mineral cracking component, or may be combined with other catalyst components in which said cracking component is dispersed, or both. In any case, the rhenium will be present in an amount of 0.01 to 3.0 weight percent, based on said cracking component and calculated as the metal.

When a conventional crystalline zeolitic molecular sieve cracking component is included in the catalyst, said molecular sieve cracking component may be of any type that is known in the art as a useful component of a conventional hydrocracking catalyst comprising a noble metal or noble metal-compound hydrogenating component. A decationized molecular sieve cracking component is preferred. Especially suitable are faujasite, particularly "Y" type and "X" type faujasite, and mordenite, in the ammonia form, hydrogen form, alkaline earth-exchanged form, or rare earth-exchanged form.

A preferred catalyst comprises said layered synthetic crystalline aluminosilicate mineral cracking component intimately dispersed in particulate form in a matrix of other catalytic components comprising alumina and a hydrogenating component selected from the group consisting of Group VI metals and compounds thereof and Group VIII metals and compounds thereof, with the rhenium or compound thereof being combined with said cracking component before the latter is dispersed in the matrix, or with the rhenium or compound thereof being a portion of the matrix. Examples of suitable matrices include matrices comprising: (a) nickel or a compound thereof and silica-alumina; (b) nickel or a compound thereof and tungsten or a compound thereof and alumina; (c) nickel or a compound thereof and molybdenum or a compound thereof and alumina; (d) nickel or a compound thereof and tungsten or a compound thereof and titania and silica-alumina; (e) nickel or a compound thereof and molybdenum or a compound thereof and titania and silica-alumina; (f) molybdenum or a compound thereof, or tungsten or a compound thereof, and alumina or silica-alumina; (g) any of the foregoing with the addition of rhenium or a compound thereof in the previously indicated amount. If desired, the Group VIII metal may be cobalt, platinum, palladium or iridium, or compounds of cobalt, platinum, palladium or iridium.

(B) Method of Preperation

The layered synthetic crystalline aluminosilicate mineral cracking component of the catalyst may be prepared, in hydrated form, in the manner set forth in Granquist U.S. Pat. 3,252,757. The mineral is dried and calcined as in the examples herein.

In the case wherein rhenium or a compound thereof is added directly to said cracking component, impregnation using an aqueous solution of a suitable rhenium compound or adsorption of a suitable rhenium compound are preferred methods of incorporating the rhenium or compound thereof into the cracking component. Ion-exchange methods whereby the rhenium component is incorporated into the cracking component by exchanging the rhenium component with a metal component already present in the cracking component may be used. However, such methods require use of a compound wherein the metal to be introduced into the cracking component is present as a cation. Compounds wherein rhenium is present as a cation are not commonly available in aqueous solution.

In the case wherein said cracking component first is dispersed in a matrix of other catalytic components and rhenium or a compound thereof is introduced into the resulting composition, again impregnation using an aqueous solution of a suitable rhenium compound or adsorption of a suitable rhenium compound are the preferred methods of introducing the rhenium or compound thereof.

The rhenium compound used in the impregnation or adsorption step generally will contain rhenium in anionic form. The compound should be one that is soluble in water, and that contains no ions that are known as contaminants in hydrocracking catalysts. Suitable rhenium compounds are perrhenic acid, $HReO_4$, and ammonium perrhenate, $NH_4ReO_4$. Impregnation also may be accomplished with an ammoniacal solution of rhenium heptoxide.

Where said cracking component, with or without added rhenium, is dispersed in a matrix of other catalyst components, the dispersion may be accomplished by cogelation of said other components around said cracking component in a conventional manner.

The finished catalyst may be sulfided in a conventional manner prior to use, if desired. If not presulfided, the catalyst will tend to become sulfided during process operation from any sulfur compounds that may be present in the hydrocarbon feed. As discussed elsewhere herein, the equilibrium degree of sulfiding at a given operating temperature will be different than in a corresponding catalytic system wherein a noble metal component rather than rhenium is present.

SEPARATE HYDROFINING CATALYST

(A) General

As previously indicated, advantageous results are obtained by providing in the reaction zone containing the hydrocracking catalyst comprising rhenium or a compound thereof and a layer synthetic crystalline aluminosilicate mineral cracking component a separate second catalyst comprising a hydrogenating component selected from Group VI metals and compounds thereof, a hydrogenating component selected from Group VIII metals and compounds thereof, and a support selected from the group consisting of alumina and silica-alumina. Pellets or other particles of this separate second catalyst may be physically mixed with said hydrocracking catalyst, but preferably are disposed in a separate catalyst bed located ahead of said hydrocracking catalyst in the same reactor shell, eliminating interstage condensation, pressure letdown and ammonia and hydrogen sulfide removal. In a preferred arrangement using downflow of hydrocarbon feed, the bed of separate second catalyst is located above said hydrocracking catalyst in the same reactor shell.

Where said separate second catalyst is located in the same reactor shell as said hydrocracking catalyst containing rhenium or a compound thereof, it is preferably present in an amount in the range of 10 to 40 volume percent of the total amount of catalyst in the reactor.

In an arrangement less preferred than the ones discussed above in this section, the separate second catalyst may be located in a separate hydrofining reactor, operated under conventional hydrofining conditions, from the effluent of which ammonia or hydrogen sulfide, or both, and also hydrocarbon products, if desired, may be removed prior to hydrocracking the remaining hydrofined feedstock in a subsequent hydrocracking reactor.

In any of the arrangements discussed in this section, the separate second catalyst preferably has hydrofining activity and hydrogenation activity, and even more preferably also has enough hydrocracking activity to convert 0.2 to 50, preferably 5 to 20, weight percent of the hydrocarbon feedstock to products boiling below the initial boiling point of the feedstock in a single pass. The hydrogenation activity preferably is sufficient to saturate or partially saturate a substantial portion of the organic oxygen, nitrogen and sulfur compounds in the feed to water, ammonia and hydrogen sulfide.

Preferably, said separate second catalyst contains nickel or cobalt or compounds thereof in an amount of 1 to 15 weight percent, calculated as metal, and molybdenum or tungsten or compounds thereof, in an amount of 5 to 30 weight percent, calculated as metal, with the remainder of the catalyst consisting of alumina, or silica-alumina containing up to 50 weight percent silica.

Particularly preferred example of said separate second catalyst, comprising silica-alumina, are:

| | Percent by weight of total catalyst, calculated as metal | | | $SiO_2/Al_2O_3$ weight ratio |
|---|---|---|---|---|
| | Ni | Mo | W | |
| 1 | 6 | 18 | | 20/80 |
| 2 | 8 | | 20 | 40/60 |

It has been found that use of said separate second catalyst increases the gasoline yield from the hydrocracking stage containing a catalyst comprising rhenium or a compound thereof, compared with the gasoline yield from the hydrocracking stage when the identical feed thereto has not been first or concurrently processed in the presence of said separate second catalyst. The increased gasoline yield probably related to the hydrogenation, in that more saturated hydrocarbon structures tend to crack more easily.

(B) Method of preparation

Said separate second catalyst may be prepared by any conventional preparation method, including impregnation of an alumina or silica-alumina support with salts of the desired hydrogenating component, or cogelation of all components, with the latter method being preferred.

As previously pointed out, the hydrocracking catalyst comprising rhenium or a compound thereof and a layered synthetic crystalline aluminosilicate has activity and stability advantages over a hydrocracking catalyst consisting of rhenium and a gel-type silica-alumina. It has been found that use of said separate second catalyst in the above-described arrangement further increases the stability of the hydrocracking catalyst containing rhenium or a compound thereof and a layered synthetic crystalline aluminosilicate, compared with the stability of the latter catalyst when the identical feed thereto has not been first or concurrently processesd in the presence of said separate second catalyst.

OPERATING CONDITIONS

The hydrocracking zone containing the catalyst comprising a layered synthetic crystalline aluminosilicate and rhenium or a compound of rhenium is operated at hydrocracking conditions including a temperature in the range 400° to 950° F., preferably 500° to 850° F., a pressure in the range 800 to 3500 p.s.i.g., preferably 1000 to 3000 p.s.i.g., a liquid hourly space velocity in the range 0.1 to 0.5, preferably 0.5 to 5.0, and more preferably 0.5 to 3.0. The total hydrogen supply rate (makeup and recycle hydrogen) to said zone is 200 to 20,000 s.c.f., preferably 2000 to 20,000 s.c.f., of hydrogen per barrel of said feedstock.

Where a separate hydrofining zone, which also may accomplish hydrogenation and some hydrocracking, is located ahead of the hydrocracking zone containing a catalyst comprising a layered synthetic crystalline aluminosilicate and rhenium or a compound of rhenium, the operating conditions in the separate hydrofining zone include a temperature of 400° to 900° F., preferably 500° to 800° F., a pressure of 800 to 3500 p.s.i.g., preferably 1000 to 2500 p.s.i.g., and a liquid hourly spaced velocity of 0.1 to 5.0, preferably 0.5 to 3.0. The total hydrogen supply rate (makeup and recycle hydrogen) is 200 to 20,000 s.c.f. of hydrogen per barrel of feedstock, preferably 2000 to 20,000 s.c.f. of hydrogen per barrel of feedstock.

Where a separate bed of hydrofining catalyst is located above a bed of the hydrocracking catalyst comprising a layered synthetic crystalline aluminosilicate and rhenium or a compound of rhenium in the same reactor shell, the space velocity through the bed of hydrofining catalyst will be a function of the space velocity through the hydrocracking catalyst bed and the amount of hydrofining catalyst expressed as a volume percent of the total catalyst in the reactor. For example, where the hydrofining catalyst is 25 volume percent of the total catalyst in the reactor, and the space velocity through the bed of hydrocracking catalyst is 0.9, the space velocity through the bed of hydrofining catalyst will be 2.7. Accordingly, the space velocity through the bed of hydrofining catalyst in the process of the present invention may range from 0.15 to 45.0.

The operating conditions in the reforming zone and catalytic cracking zone employed in various embodiments of the present invention are conventional conditions known in the art.

PROCESS OPERATION WITH REFERENCE TO DRAWING

Referring now to FIG. 1 of the drawing, in accordance with a primary embodiment of the present invention, a hydrocarbon feedstock as previously described, which in this case may boil above 400° F., is passed through line 1 into hydrocracking zone 2, which contains a hydrocracking catalyst comprising a layered synthetic crystalline aluminosilicate mineral cracking component, as previously described, and 0.01 to 3.0 weight percent, based on said cracking component, of rhenium. As previously discussed, the rhenium and layered synthetic crystalline aluminosilicate mineral component may be dispersed in a matrix of other catalyst components. Also as previously discussed, a separate second catalyst, previously described, may be located in hydrocracking zone 2. The feedstock is hydrocracked in hydrocracking zone 2 at conditions previously discussed, in the presence of hydrogen supplied through line 3. From hydrocracking zone 2 an effluent is withdrawn through line 4, hydrogen is separated therefrom in separator 5, and hydrogen is recycled to hydrocracking zone 2 through line 6. From separator 5, hydrocracked materials are passed through lines 7 and 8 to distillation column 9, where they are separated into fractions, including a $C_4^-$ fraction which is withdrawn through line 10, a $C_5$—180° F. fraction which is withdrawn through line 11, and a 180°–400° F. fraction which is withdrawn through line 12.

Still referring to FIG. 1, in accordance with another embodiment of the present invention, the 180°–400° F. fraction in line 12 is reformed under conventional catalytic reforming conditions in reforming zone 13, from which a catalytic reformate is withdrawn through line 14.

Still referring to FIG. 1, in accordance with another embodiment of the present invention, a hydrocarbon feedstock which is to be hydrofined and/or hydrogenated, and partially hydrocracked, if desired, in a separate hydrotreating zone prior to being hydrocracked in hydrocracking zone 2, is passed through line 15 to hydrotreating zone 16 containing a catalyst, as previously described, having hydrofining and/or hydrogenation activity. The feedstock is hydrotreated in zone 16 at conditions previously described, in the presence of hydrogen supplied through line 17. The effluent from hydrotreating zone 16 is passed through line 18 to separation zone 19, from which hydrogen separated from the treated feedstock is recycled through line 20 to hydrotreating zone 16. In zone 19, water entering through line 21 is used to scrub ammonia and other contaminants from the incoming hydrocarbon stream, and the ammonia, water and other contaminants are withdrawn from zone 19 through line 22. The scrubbed feedstock is passed through line 8 to distillation column 9 and thence to hydrocracking zone 2.

Figure 2:
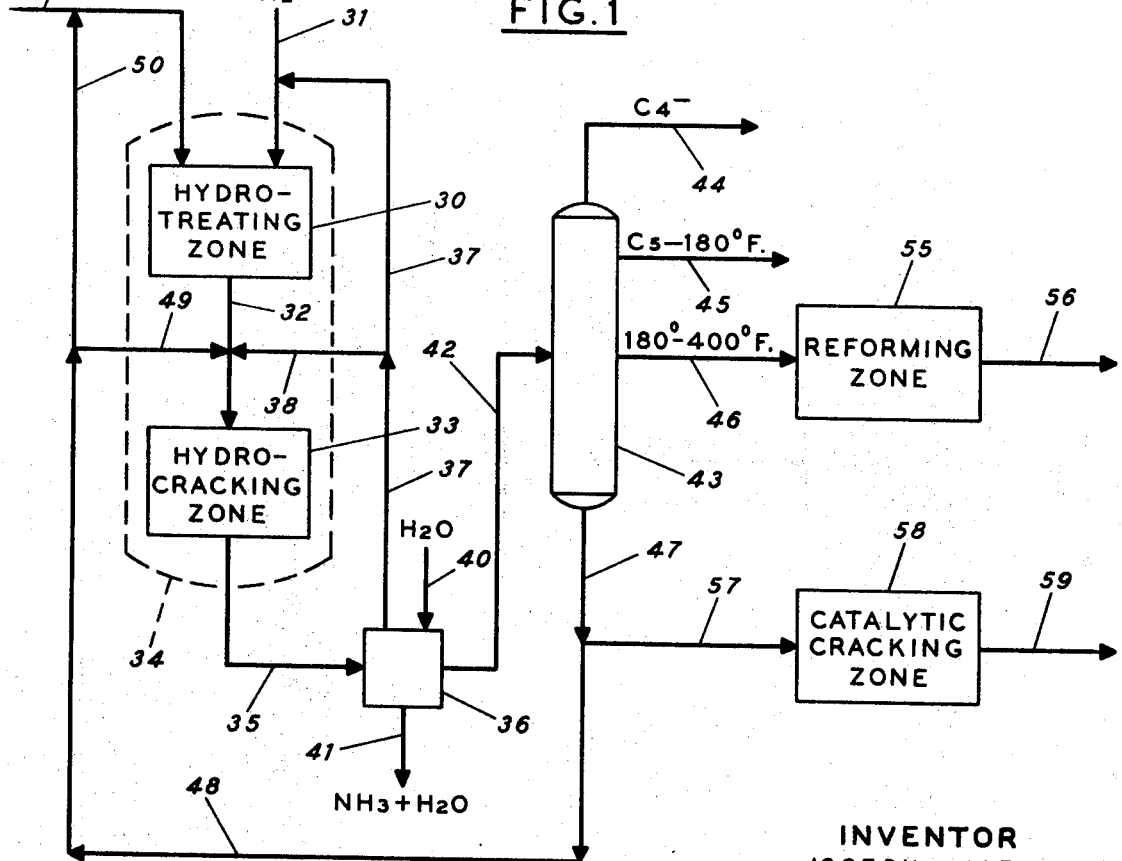
FIG. 2 is a diagrammatic illustration of apparatus and flow paths suitable for carrying out the process of additional embodiments of the present invention, including embodiments wherein a hydrofining zone precedes a hydrocracking zone in a single reactor shell, and embodiments wherein a selected fraction from the hydrocracking zone is catalytically cracked.

Referring now to FIG. 2, a hydrocarbon feedstock, as previously described, which in this case may boil above 400° F., is passed through line 29 to hydrotreating zone 30 containing a catalyst, as previously described, having hydrofining and/or hydrogenation activity. The feedstock is hydrofined and/or hydrogenated, and partially hydrocracked, if desired, in zone 30, at conditions previously described, in the presence of hydrogen supplied through line 31. The effluent from zone 30 is passed through line 32, without intervening impurity removal, into hydrocracking zone 33, where it is hydrocracked in the presence of a hydrocracking catalyst comprising a layered synthetic crystalline aluminosilicate mineral cracking component, as previously described, and 0.01 to 3.0 weight percent, based on said cracking component, of rhenium. Said catalyst may contain other catalytic components, and a separate second catalyst may be present in zone 33, as described in connection with zone 2 in FIG. 1. Hydrotreating zone 30 and hydrocracking zone 33 may be located in separate reactor shells, which may be operated at different pressures. Alternatively, and in a preferred manner of operation, hydrotreating zone 30 and hydrocracking zone 33 may be separate catalyst beds located in a single pressure shell 34, and the effluent from zone 30 may be passed to zone 33 without intervening pressure letdown, condensation or impurity removal. The effluent from zone 33 is passed through line 35 to separation zone 36, from which hydrogen is recycled through line 37 to hydrotreating zone 30. All or a portion of the recycled hydrogen may be passed through line 38 to hydrocracking zone 33, if desired. In separation zone 36, water entering through line 40 is used to scrub ammonia and other contaminants from the incoming hydrocarbon stream, and the ammonia, water and other contaminants are withdrawn from zone 36 through line 41. The effluent from zone 36 is passed through line 42 to distillation column 43, where it is separated into fractions, including a $C_4^-$ fraction which is withdrawn through line 44, a $C_5$—180° F. fraction which is withdrawn through line 45, a 180°–400° F. fraction which is withdrawn through line 46, and a fraction boiling above 400° F. which is withdrawn through line 47. The fraction in line 47 may be recycled through lines 48 and 49 to hydrocracking zone 33. All or a portion of the fraction in line 48 may be recycled to hydrotreating zone 30 through line 50, if desired.

Still referring to FIG. 2, in accordance with another embodiment of the present invention, the 180°–400° F. fraction in line 46 may be passed to a catalytic reforming zone 55, where it may be reformed in the presence of a conventional catalytic reforming catalyst under conventional catalytic reforming conditions to produce a catalytic reformate, which is withdrawn from zone 55 through line 56.

Still referring to FIG. 2, in another embodiment of the present invention, all or a portion of the fraction in line 47 may be passed through line 57 to catalytic cracking zone 58, which may contain a conventional catalytic cracking catalyst and which may be operated under conventional catalytic cracking conditions, and from which a catalytically cracked effluent may be withdrawn through line 59.

EXAMPLES

The following examples are given for the purpose of further illustrating the practice of the process of the present invention. However, it is to be understood that these examples are given by way of exemplification only, and are not intended in any way to limit the scope of the present invention.

EXAMPLE 1

A catalyst consisting of rhenium and a layered synthetic crystalline aluminosilicate mineral in accordance with the present invention is prepared in the following manner.

These starting materials are used:

(1) 500 grams of a layered synthetic crystalline aluminosilicate mineral as described in Grandquist U.S. Pat. 3,252,757.

(2) 1000 cc. of an aqueous solution of perrhenic acid ($HReO_4$), containing 10.8 grams of rhenium.

The mineral, in lumpy powder form, is introduced into a Hobart kitchen blender, followed by slow addition of the perrhenic acid solution while stirring, to form a pasty mass. The pasty mass is transferred to a dish and dried at 120° F. for approximately 16 hours. The resulting dried material is pressed through a 40-mesh screen to obtain fine granules. The granules are blended with a 1% Sterotex lubricant binder, and tabletted. The tablets are calcined in flowing air for 2 hours at 1200° F. The tabletted, calcined rhenium-containing material is crushed, and a resulting 8–16 mesh fraction thereof is separated for use as a catalyst in the process of the present invention. This catalyst contains an amount of rhenium approaching the theoretical amount based on the amounts of ingredients used. This indicates that, although rhenium oxides normally are quite volatile, in this method of preparation only a small amount of rhenium is lost during drying and calcination.

EXAMPLE 2

A catalyst consisting of a rhenium-impregnated layered synthetic crystalline aluminosilicate mineral in a matrix of other catalytic components, in accordance with the present invention, is prepared. The final catalyst consists of 20% of the catalyst of Example 1 and 80% of a matrix containing nominally 8% nickel, 18% tungsten, 7% titanium dioxide, 30% alumina and 30% silica.

The catalyst of this example is prepared in the following manner:

(1) The impregnated aluminosilicate mineral, metals, silica and alumina are combined in a solution.
(2) The solution is gelled by pH control.
(3) The resulting slurry is filtered, washed and dried.
(4) The dried filter cake is tabletted, calcined in flowing air for 5 hours, and crushed for use as a catayst in the process of the present invention.

EXAMPLE 3

The catalyst of Example 1 is used to hydrocrack a light cycle oil hydrocarbon feedstock of the following description:

| | |
|---|---:|
| Gravity, °API | 19.5 |
| Aniline point, °F. | 62 |
| Sulfur content, weight percent | 0.43 |
| Nitrogen content, parts per million | 330 |
| Aromatics content, liquid volume percent | 70 |
| Boiling range, ASTM D–1160 distillation: | |
| ST/5 | 381/471 |
| 10/30 | 492/532 |
| 50 | 568 |
| 70/90 | 598/635 |
| 95/EP | 648/681 |

The hydrocracking is accomplished, on a once-through basis, at an average catalyst temperature of 732° F., a pressure of 2100 p.s.i.g., a liquid hourly space velocity of 0.9, and a hydrogen supply rate of 12,000 s.c.f. per barrel of hydrocarbon feedstock. The hydrogen consumption is 2000 s.c.f per barrel of hydrocarbon feedstock.

The product distribution is as follows:

| | Weight percent |
|---|---:|
| $C_1$ | 0.1 |
| $C_2$ | 0.3 |
| $C_3$ | 2.8 |
| $iC_4$ | 4.6 |
| $nC_4$ | 4.4 |
| $C_5$—180° F. | 10.7 |
| 180°–400° F. | 34.1 |
| 400° F.+ | 45.8 |

The 180°–400° F. portion of the product is characterized by a gravity of 39.7° API and by a paraffin/naphthene/aromatic ratio of 15/35/50.

The 400° F.+ portion of the product is characterized by a gravity of 30.5° API and by an aniline point of 98.0° F.

EXAMPLE 4

The 180°–400° F. portion of the product of Example 3 is catalytically reformed, using a conventional reforming catalyst and conventional reforming conditions, and is found to be a superior feedstock for this operation. The catalytic reformate is combined with the $C_5$—180° F. portion of the product of Example 3, to produce a gasoline pool. When $C_4$ hydrocarbons are blended into this gasoline pool in an amount sufficient to provide a pool Reid Vapor Pressure of 10, while conducting the reforming to provide a 91 F–1 Clear pool octane number, the total gasoline pool is 58 liquid volume percent of the light cycle oil feedstock hydrocracked in Example 3, i.e., in this operation a 58 liquid volume percent yield, based on the hydrocracking zone feed, of a 91 F–1 Clear gasoline having a Reid Vapor Pressure of 10, is obtained.

EXAMPLE 5

The 400° F.+ portion of the product of Example 3, characterized by a gravity of 30.5° API and by an aniline point of 98.0° F., is recycled to the catalytic cracking unit which produced the light cycle oil feed used in Example 3. This upgrades the total feed to the catalytic cracking unit, and causes decreased coke production and increased gasoline production in that unit. These improved results are made possible because of the improved characteristics of the 400° F.+ materials recycled from the hydrocracking zone to the catalytic cracking unit, compared with the approximately 400° F.+ light cycle oil supplied to the hydrocracking zone from the catalytic cracking unit.

|  | Gravity, °API | Aniline point, °F. |
|---|---|---|
| Feed to hydrocracking zone | 19.5 | 62 |
| 400° F.+ recycle from hydrocracking zone to catalytic cracking unit | 30.5 | 98 |

EXAMPLE 6

A catalyst prepared exactly as in Example 1, and having the same composition as the catalyst of Example 1, is used to hydrocrack another portion of the same light cycle oil hydrocarbon feedstock that is referred to in Example 3.

The hydrocracking is accomplished on a recycle basis, that is, with the 400° F.+ portion of the product being recycled to the hydrocracking zone, at an average catalyst temperature of 761° F., a total pressure of 2100 p.s.i.g., a liquid hourly space velocity of 0.9, and a total hydrogen supply rate of 5500 s.c.f. per barrel of hydrocarbon feedstock.

The product distribution is as follows:

Weight percent

| | |
|---|---|
| $C_1$ | 0.1 |
| $C_2$ | 1.2 |
| $C_3$ | 7.5 |
| $iC_4$ | 9.6 |
| $nC_4$ | 7.2 |
| $C_5$—180° F. | 21.8 |
| 180°–400° F. | 56.5 |

The 180°–400° F. portion of the product is characterized by a gravity of 40.9° API and by a paraffin/naphthene/aromatic ratio of 17/31/52.

EXAMPLE 7

The 180°–400° F. portion of the product of Example 6 is catalytically reformed, using a conventional reforming catalyst and conventional reforming conditions, and is found to be a superior feedstock for this operation. The catalytic reformate is combined with the $C_5$—180° F. portion of the product of Example 6, to produce a gasoline pool. When $C_4$ hydrocarbons are blended into this gasoline pool in an amount sufficient to provide a pool Reid Vapor Pressure of 10, while conducting the reforming to provide a 91 F–1 Clear pool octane number, the total gasoline pool is 105 liquid volume percent of the light cycle oil feedstock hydrocracked in Example 6, i.e., in this operation a 105 liquid volume percent yield, based on the hydrocracking zone light cycle oil feed, of 91 F–1 Clear gasoline having a Reid Vapor Pressure of 10, is obtained.

EXAMPLE 8

A first bed of hydrocracking catalyst prepared exactly as in Example 1, and having the same composition as the catalyst of Example 1, is placed in a reactor. A second bed of catalyst is placed in the reactor above the first bed. The volume of the second bed is 25% of the total catalyst volume. The catalyst in the second bed, prepared by impregnation of metals on silica-alumina pellets, has the following composition:

Weight percent

| | |
|---|---|
| NiO | 7.6 |
| $MoO_3$ | 27.0 |
| $SiO_2$ | 14.4 |
| $Al_2O_3$ | 51.0 |

Another portion of the same light cycle oil feedstock that is referred to in Example 3 is passed downwardly through both catalyst beds in the reactor together with added hydrogen, the hydrogen and cycle oil sequentially contacting the catalyst beds, with no product or impurity removal between beds, at the following conditions:

| | |
|---|---|
| Average catalyst temperature, °F | 720 |
| Pressure, p.s.i.g. | 1300 |
| Hydrogen supply rate, s.c.f. per barrel of hydrocarbon feedstock | 5600 |
| Liquid hourly spaced velocity of hydrocarbon feedstock through upper bed v./v./hr | 2.7 |
| Liquid hourly spaced velocity of hydrocarbon feedstock through lower bed v./v./hr | 0.9 |
| Per-pass conversion to products boiling below 400° F., liquid volume percent | 80.0 |

The portion of the product boiling above 400° F. is recycled to the reactor. The hydrogen consumption is 3500 s.c.f. per barrel of hydrocarbon feedstock (fresh plus recycle feedstock).

The product distribution of the 400° F.⁻ product is as follows:

Weight percent

| | |
|---|---|
| $C_1$ | 0.1 |
| $C_2$ | 0.4 |
| $C_3$ | 2.6 |
| $iC_4$ | 5.4 |
| $nC_4$ | 3.4 |
| $C_5$—400° F. | 91.5 |

EXAMPLE 9

The 180°–400° F. portion of the product of Example 8 is catalytically reformed, using a conventional reforming catalyst and conventional reforming conditions, and is found to be a superior feedstock for this operation. The catalytic reformate is combined with the $C_5$—180° F. portion of the product of Example 8 to produce a gasoline pool. When $C_4$ hydrocarbons are blended into this gasoline pool in an amount sufficient to provide a pool Reid Vapor Pressure of 10, while conducting the reforming to provide a 91 F–1 Clear pool octane number, the total gasoline pool is 117 liquid volume percent of the light cycle oil feedstock hydrocracked in Example 8, i.e., in this operation a 117 liquid volume percent yield, based on the fresh hydrocarbon feed to the reactor in

15

Example 8, of a 91 F-1 Clear gasoline having a Reid Vapor Pressure of 10, is obtained.

EXAMPLE 10

A catalyst prepared exactly as in Example 2, and having the same composition as the catalyst of Example 2, is used to hydrocrack another portion of the same light cycle oil hydrocarbon feedstock referred to in Example 3.

The hydrocracking is accomplished on a recycle basis, that is, with the 400° F.+ portion of the product being recycled to the hydrocracking zone, at an average catalyst temperature of 734° F., a total pressure of 1400 p.s.i.g., a liquid hourly space velocity of 1.2, a total hydrogen supply rate of 12,500 s.c.f. per barrel of hydrocarbon feedstock, and a chemical hydrogen consumption of 3000 s.c.f. per barrel of hydrocarbon feedstock.

The product distribution is as follows:

| | Weight percent |
|---|---|
| $C_1$ | 0.1 |
| $C_2$ | 0.5 |
| $C_3$ | 3.4 |
| $iC_4$ | 9.3 |
| $nC_4$ | 4.2 |
| $C_5$—180° F. | 23.9 |
| 180°–400° F. | 63.4 |

EXAMPLE 11

A catalyst (Catalyst A) prepared exactly as in Example 2, and having the same composition as in Example 2, is used to hydrocrack another portion of the light cycle oil hydrocarbon feedstock referred to in Example 3.

The hydrocracking is accomplished on a recycle basis, at a per-pass conversion of 80 liquid volume percent to products boiling below 400° F., a total pressure of 1300 p.s.i.g., a liquid hourly space velocity of 0.9, and a total hydrogen supply rate of 5600 s.c.f. per barrel of hydrocarbon feedstock.

An identical run is made with a catalyst (Catalyst B) that is identical but that contains no rhenium. Another identical run is made with a catalyst (Catalyst C) that is identical except that instead of rhenium the layered synthetic crystalline aluminosilicate mineral component of the catalyst contains 5 percent nickel.

The activities of these catalysts, as indicated by the starting temperatures necessary to achieve the indicated per-pass conversion, are as follows:

| | Starting T., ° F. |
|---|---|
| Catalyst A | 715 |
| Catalyst B | 725 |
| Catalyst C | 743 |

EXAMPLE 12

The run of Example 8 is repeated exactly, except using the catalyst of Example 1 unaccompanied in the reactor by a bed of hydrogenation catalyst. The average catalyst temperature needed to obtain the same per-pass conversion is 810° F., compared with 720° F. in Example 8, thereby indicating that the process of the present invention may be further improved by hydrotreating the feedstock prior to hydrocracking it in the presence of the hydrocracking catalyst comprising a layered synthetic crystalline aluminosilicate mineral and rhenium or a compound of rhenium.

What is claimed is:
1. A catalyst comprising:
  (A) A dried and calcined layer-type, clay-like mineral which prior to drying and calcining has the empirical formula

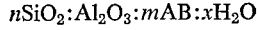
  $$nSiO_2:Al_2O_3:mAB:xH_2O$$

where the layer lattices comprise said silica, said alumina, and said B, and where
  $n$ is from 2.4 to 3.0
  $m$ is from 0.2 to 0.6
  A is one equivalent of an exchangeable cation hav-

16 ing a valence not greater than 2, and is external to the lattice,
  B is chosen from the group of negative ions which consists of $F^-$, $OH^-$, $\frac{1}{2}O^{--}$ and mixtures thereof, and is internal in the lattice, and
  $x$ is from 2.0 to 3.5 at 50% relative humidity, said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations; and
  (B) A hydrogenating component selected from the group consisting of rhenium and compounds of rhenium.

2. A catalyst as in claim 1, wherein said mineral is present in an amount of 10 to 99.9 weight percent, based on the total catalyst.

3. A catalyst as in claim 1, which further comprises a crystalline zeolitic molecular sieve component, in the amount of 1 to 40 weight percent, based on the total catalyst.

4. A catalyst as in claim 1, wherein said hydrogenating component is present in said catalyst in an amount of 0.01 to 3.0 weight percent, based on said mineral.

5. A catalyst as in claim 1, wherein A is chosen from the group consisting of $H^+$, $NH_4^+$, $Na^+$, $Li^+$, $K^+$, $\frac{1}{2}Ca^{++}$, $\frac{1}{2}Mg^{++}$, $\frac{1}{2}Sr^{++}$, and $\frac{1}{2}Ba^{++}$ and mixtures thereof.

6. A catalyst as in claim 1, wherein said catalyst further comprises a hydrogenating component selected from the group consisting of Group VI metals and compounds thereof and Group VIII metals and compounds thereof, and a component selected from the group consisting of alumina and silica-alumina.

7. A hydrocracking process which comprises contacting a hydrocarbon feedstock containing substantial amounts of materials boiling above 200° F. and selected from the group consisting of petroleum distillates, solvent-deasphalted petroleum residua, shale oils and coal tar distillates, in a reaction zone with hydrogen and the catalyst of claim 1, at hydrocracking conditions including a temperature in the range 400° to 950° F., a pressure in the range 800 to 3500 p.s.i.g., a liquid hourly space velocity in the range 0.1 to 5.0 and a total hydrogen supply rate of 200 to 20,000 s.c.f. of hydrogen per barrel of said feedstock, and recovering from said reaction zone valuable products, including gasoline.

8. A process as in claim 7, wherein said catalyst further comprises a hydrogenating component selected from the group consisting of Group VI metals and compounds thereof and Group VIII metals and compounds thereof, and a component selected from the group consisting of alumina and silica-alumina.

9. A process as in claim 7, wherein said hydrocarbon feedstock contains 0.5 to 1000 p.p.m. organic nitrogen.

10. A process as in claim 7, wherein said reaction zone contains, in addition to said catalyst, a separate second catalyst comprising a hydrogenating component selected from Group VI metals and compounds thereof, a hydrogenating component selected from Group VIII metals and compounds thereof, and a component selected from the group consisting of alumina and silica-alumina.

11. A process as in claim 10 wherein said separate second catalyst is located in said reaction zone in a bed disposed above said catalyst of claim 1.

12. A hydrocracking process which comprises sequentially contacting a hydrocarbon feedstock and hydrogen with a first bed of catalyst and then with a second bed of catalyst, said catalyst beds both being located within a single elongated reactor pressure shell, said first bed of catalyst being located in an upper portion of said shell, the catalyst of said first bed comprising a hydrogenating component selected from the group consisting of Group VI metals and compounds thereof and Group VIII metals and compounds thereof and a component selected from the group consisting of alumina and silica-alumina, the catalyst of said second bed being the catalyst of claim 1, maintaining said first bed of catalyst and said second bed of catalyst at a temperature in the range 400° to 950° F., and a pressure in the range of 800 to 3500 p.s.i.g. during said contacting, maintaining the total supply rate of said hydrogen into said reactor shell from 200 to 20,000 s.f.c. of hydrogen per barrel of said feedstock, and recovering a gasoline product from the effluent from said second bed of catalyst.

13. A process as in claim 12 wherein the effluent from said second bed of catalyst is separated into fractions, including a light gasoline fraction, a heavy gasoline fraction, and a fraction boiling generally higher than said heavy gasoline fraction.

14. A process as in claim 13 wherein said heavy gasoline fraction is catalytically reformed.

15. A process as in claim 13 wherein said fraction boiling generally higher than said heavy gasoline fraction is catalytically cracked.

References Cited

UNITED STATES PATENTS

| | | | |
|---|---|---|---|
| 3,132,087 | 5/1964 | Kelley et al. | 208—60 |
| 3,236,762 | 2/1966 | Rabo et al. | 208—120 |
| 3,252,757 | 5/1966 | Granquist | 208—120 |

DELBERT E. GANTZ, Primary Examiner

A. RIMENS, Assistant Examiner

U.S. Cl. X.R.

23—111; 208—60, 120; 252—455